United States Patent [19]

Jost et al.

[11] Patent Number: 4,675,798
[45] Date of Patent: Jun. 23, 1987

[54] DIRECT COUPLED SWITCHING POWER SUPPLY WITH GTO SCR SWITCHING ELEMENT

[75] Inventors: Steve R. Jost; John S. Prentice, both of Palm Bay, Fla.

[73] Assignee: Harris Corporation, Melbourne, Fla.

[21] Appl. No.: 754,711

[22] Filed: Jul. 15, 1985

[51] Int. Cl.⁴ .................... H02H 7/127; H02H 7/145; G05F 1/563
[52] U.S. Cl. ...................... 363/54; 323/266; 323/300; 363/81; 363/86
[58] Field of Search ............ 363/85, 86, 89, 128, 363/79-81, 54; 323/299, 266, 300; 307/252 C

[56] References Cited

U.S. PATENT DOCUMENTS

| | | | |
|---|---|---|---|
| 3,353,082 | 11/1967 | Mellott et al. | 363/86 |
| 4,001,668 | 1/1977 | Lewis | 323/299 |
| 4,495,557 | 1/1985 | Weit | 363/129 |

FOREIGN PATENT DOCUMENTS

| | | | |
|---|---|---|---|
| 22491 | 6/1972 | Japan | 323/299 |
| 44462 | 4/1979 | Japan | 363/86 |
| 79315 | 6/1981 | Japan | 363/86 |
| 88667 | 7/1981 | Japan | 361/86 |
| 31014 | 2/1982 | Japan | 363/89 |

Primary Examiner—William H. Beha, Jr.
Attorney, Agent, or Firm—T. N. Twomey; C. C. Krawczyk

[57] ABSTRACT

An improved switching arrangement for a direct coupled switching power supply is provided by utilizing a gate turn off SCR as the primary switching element and a second SCR as the turn-off control such that upon detection of any of a fully charged storage element, an excessive current through the gate turn off SCR, or an insufficient input voltage, the switch is turned off.

17 Claims, 4 Drawing Figures

DIRECT COUPLED SWITCHING POWER SUPPLY WITH GTO SCR SWITCHING ELEMENT

FIELD OF THE INVENTION

The present invention provides a technique using electronic and electromechanical means to generate a stable and predetermined voltage or current source directly from an AC source of much higher magnitude without requiring transformers or other commonly used external voltage reducing means while providing extremely high power conversion effeciencies. More specifically, the present invention relates to the generation of a D.C. output from any AC source over a wide frequency range and capable of receiving voltages of greatly diverse magnitudes.

Existing techniques in the power supply art for converting power from an AC source at high voltage to a power source of significantly lower voltage dates back many years since almost every electronic circuit requires some predetermined voltage level. Existing power supply techniques can be grouped into three categories. First, simple transformer supplies which consist of a voltage reducing transformer, a rectifier and a regulator; second, simple zener referenced power supplies and filters which use a resistor or other current limiting means to reduce the incoming voltage to the desired level; and third, switch mode power supplies which provide voltage reduction using high efficiency electronic switching and inductors or toroidal transformers.

The present invention is of the third general type mentioned above. The following U.S. patents are illustrative of prior approaches using switch mode power supplies. Choi, U.S. Pat. No. 4,433,368, issued Feb. 21, 1984, discloses a switch mode power supply for use with an AC source. Referring to FIG. 2 thereof, the power supply comprises a rectifier, an SCR, a capacitor, a trigger circuit for controlling the SCR and a series connected ripple removing filter. This patent uses a choke coil (2)in series with the SCR firing circuit and is directed to the specific details of the ripple removing filter.

Scantlin, U.S. Pat. No. 3,769,573, issued Oct. 30, 1973, discloses a regulated power supply including a capacitor connected across the input of the voltage regulator and shows charging of the capacitor with current controlled by the selective gating of an SRC. A resistor and a zener diode are used to control the SCR conduction angle. Scantlin however has not protected his circuit from destruction in the event of excessive currents.

"On-Chip Power Supply for 110 V Line Input, by Pomper, Muller and Weidlich published December 1978 in IEEE Journal of Solid State Circuits is described in their abstract as: "An on-chip power supply in ESFI-SOS technology with only one external capacitor is presented. The circuit, which can directly be applied to 110 V ac line voltages, comprises a bridge rectifier, a "lambda"-type current switch. and a series regulator with overload protection. Because of the relatively small area consumption (6 mm$^2$) the circuit to be supplied can easily be integrated on the same chip. Experimental results show a dc output power of about 100 m$^W$ (10 V/10 mA). Due to the lambda-type current switching high efficiencies of more than 30 percent are achieved. With some additional device modifications to increase breakdown voltage it should be possible to operate such circuits also with 220 V ac line voltages."—IEEE Journal of Solid-State Circuits, Vol. SC-13, No. 6, December 1978, page 882.

It is noted that in the above article at page 885, an external transformer is used with the circuits disclosed and that the diodes utilized in the bridge rectifier result in a resistance of 180 ohms thus performing a substantial voltage reduction. Further, this voltage reduction is attributed to a thin epitaxial film which causes the high resistances in the diodes of the implementation disclosed. Still further, in the event that the external capacitor fails in the circuit disclosed, there is no current limiting means in the voltage pre-regulator thus leaving the circuit prone to destruction.

SUMMARY OF THE INVENTION

An object of the present invention is to provide a monolithic power supply.

Another object of the invention is to provide a power supply operated from the AC line without transformers or other external voltage reducing means.

Still another object of the invention is to provide a predetermined stable DC voltage or current source that is insensitive to the magnitude of the incoming AC power source over a wide range while providing overcurrent and overvoltage protection.

Still another object of the invention is to provide the pre-determined DC voltage or current source that is insensitive to the magnitude of the incoming power source and is provided using high efficiency switching techniques in a completely integrated form on one semiconductor chip.

A further object of the invention is to provide a uniquely compact power supply having high efficiency in widely varying applications.

Another object of the invention is to provide an unregulated DC source to the input of the series regulator, which then performs the precise regulation and further redundant short circuit protection as required by the application.

These and other objects of the present invention are attained by charging a capacitor using a direct current component of the incoming AC source at an increased number of transfer periods. The negative (or positive) terminal of the capacitor is connected in common to both the return side of the incoming line source and the return side of said power supply output terminal. The circuitry of the present invention may be implemented in a single semiconductor chip having the capability of being connected directly to any external AC or DC supply having at least as high a voltage as the desired output, and will handle widely varying voltage and current demands. As a result of on chip overvoltage and overcurrent protection, no peripheral protection circuitry is required.

Charging current is provided through the switch circuit to the charge storage means when the voltage on the AC line slightly exceeds the voltage on the charge storage means, thus causing current to flow through a first SCR. A turn off mechanism is provided to prevent charging of the charge storage means at too great a rate and to prevent the voltage on the charge storage means from exceeding a selected upper limit.

The prevention of damage to the circuit resulting from excessive currents is accomplished by sensing the current flowing through the switch circuit, and upon detection of current exceeding a selected upper limit, a by-pass current path is established to cause a decrease in the current provided to the charge storage means.

In one embodiment, the by-pass current path includes an SCR which is turned ON when the excessive current flows through the switch circuit. The SRC allows current to bypass the switch circuit and is arranged in the circuit such that the by-pass current path is maintained until the voltage on the AC line drops below the voltage necessary to hold the by-pass SCR in an ON state. In this embodiment, the SCR acts to turn the switch circuit off to thereby electrically isolate the charge storage means from the AC line. Thus, the current to the charge storage means is totally cut off, except for any leakage which might occur through the switch circuitry. The ability to isolate the charge storage means, a capacitor in this embodiment, from the AC line may be obtained through the use of a reverse biased PN junction capable of providing isolation at line voltages exceeding 500 volts.

DETAILED DESCRIPTION OF THE INVENTION

Figure 1:
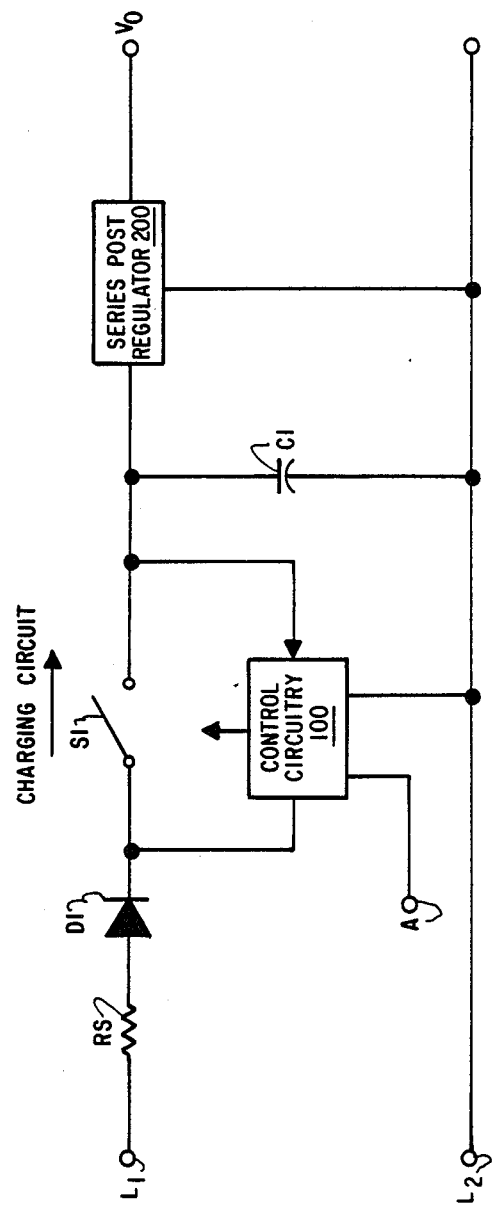
FIG. 1 is a block diagram showing the relative function inteconnections existing in the invention.

FIG. 1 shows a block diagram of the power supply of the invention. A high voltage AC line is connected to terminals $L_1$ and $L_2$ of the power supply. An input resistor $R_s$ is optional and if provided will establish an initial current reducing means. As is illustrated, a half wave rectifying means is provided by diode $D_1$ and the switch means $S_1$ is operable to establish a current path to the high terminal HT of the charge storage means, which in this illustration is a capacitor $C_1$. Thus, when switch $S_1$ is closed, capacitor charging current may flow from the AC line through the resistor $R_s$ and diode $D_1$. Operation of switch $S_1$ is controlled by control circuitry 100 which includes means for detecting the existence of a line voltage exceeding the voltage on the capacitor $C_1$ in order to insure that switch $S_1$ is on only when the line voltage exceeds the capacitor voltage. Control circuitry 100 also inclues a voltage detection means to provide the capability of opening switch $S_1$ when the charge storage means has reached an upper voltage limit. Terminal A is the control node for the upper voltage limit. Thus, if the output at terminal $V_0$ is to be used as the voltage control reference, terminal A should be connected to terminal $V_0$. Another function of control circuitry 100 is the power supply protection means which includes a current detection means for detecting the current flowing through switch $S_1$ and for opening switch $S_1$ if excessive current is flowing.

A series post regulator 200 is optionally provided for establishing a smoothed output waveform which is relatively insensitive to the minor voltage variations on capacitor $C_1$ and which has an additional voltage level controlling function.

Figure 2:
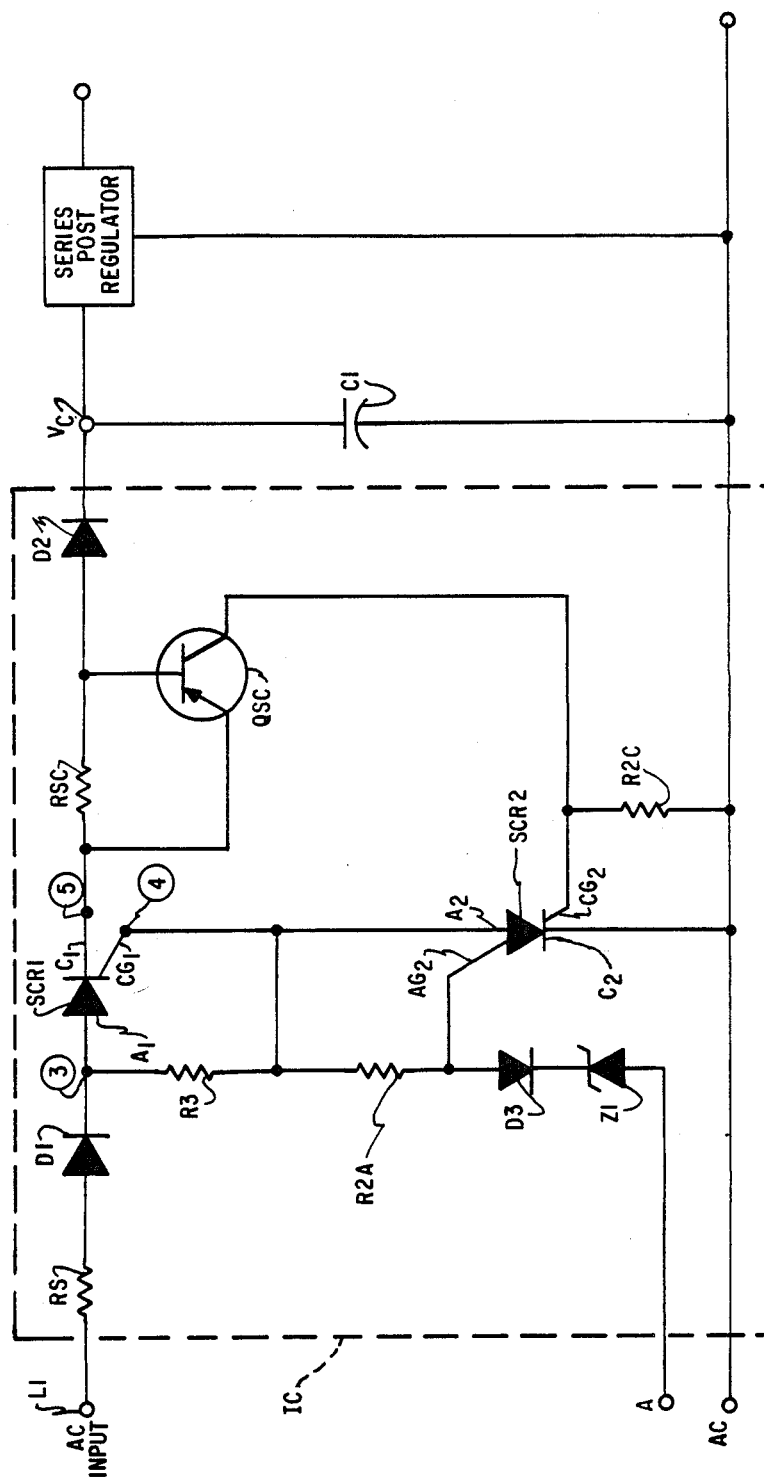
FIG. 2 is a schematic diagram of one embodiment of the invention.

A more detailed description of the switch control circuit of the invention is provided with respect to FIG. 2. As in FIG. 1, the optional input resistor $R_s$ and the half wave rectifier $D_1$ are connected in series to input terminal $L_1$ which terminal is connected to the electric line, presumed to be a high voltage AC line. For purposes of this invention, the power supply is capable of receiving input voltages from an AC line carrying in excess of 250 volts RMS Dashed line IC encloses the circuitry which, in this embodiment, is provided on a single integrated circuit.

The switch means illustrated in FIG. 1 is shown as $SCR_1$ which is a gate turn off SCR. This device is turned ON when the potential at its anode, node 3, exceeds the potential at its cathode, node 5, such that a current begins to flow from the anode through bleed resistor $R_3$ into the cathode gate, node 4. Thus, whenever the voltage on the AC line exceeds the voltage on the charge storage means, shown as capacitor $C_1$, the switch means will be turned on by the first aspect of the control circuitry which includes the resistor $R_3$ and the cathode gate. Because of diode $D_2$, the voltage differential by which line voltage must exceed capacitor voltage in order to initiate conduction, is incremented by the junction voltage of diode $D_2$. Thus, whenever the AC line voltage exceeds the capacitor voltage by an amount exceeding thejunction voltage of diode $D_2$ plus the junction voltage drop of diode $D_1$, plus the voltage required to initiate conduction from the cathode gate through the cathode, then the switch will receive a turn-on input from the control circuitry.

Once $SCR_1$ is turned on, it will remain on as long as current is flowing through the anode to the cathode of the device even when the current flow into the cathode gate is interrupted. However, this condition is desired only when capacitor $C_1$ is not already fully charged. Thus, once the capacitor $C_1$ reaches a fully charged voltage level, the switch is desirably turned off and held off until the voltage on the capacitor drops below a given level. The detection of a fully charged condition on capacitor $C_1$ is implemented by providing resistor $R_{2A}$, a second SCR, $SCR_2$, a third diode, $D_3$ and a zener diode, $Z_1$. Node A is connected to a reference potential which will serve as the starting point in the description of the high voltage turn-off function.

In a preferred arrangement, node A may be connected to the output of a series post regulator. The upper voltage limit at the capacitor high terminal will be approximately the sum of the voltage applied to node A ($V_A$) plus the avalanche voltage of the zener diode $Z_1$ ($V_{z1}$). When the capacitor voltage $V_c$ reaches approximately $V_A+V_{z1}$, the zener diode $Z_1$ conducts thereby triggering $SCR_2$ by providing turn on voltage to the anode gate $AG_2$ of $SCR_2$. Triggering of $SCR_2$ causes the anode $A_2$ to cathode $C_2$ current path to be established, thus pulling current out of the cathode gate $CG_1$ of $SCR_1$. This is the turn-off mechanism for the gate turn off SCR, $SCR_1$, thus, the charging current through $SCR_1$ to $C_1$ is stopped when capacitor $C_1$ is fully charged. As soon as $SCR_1$ is turned off, the current through $CG_1$ is discontinued.

Figure 4:
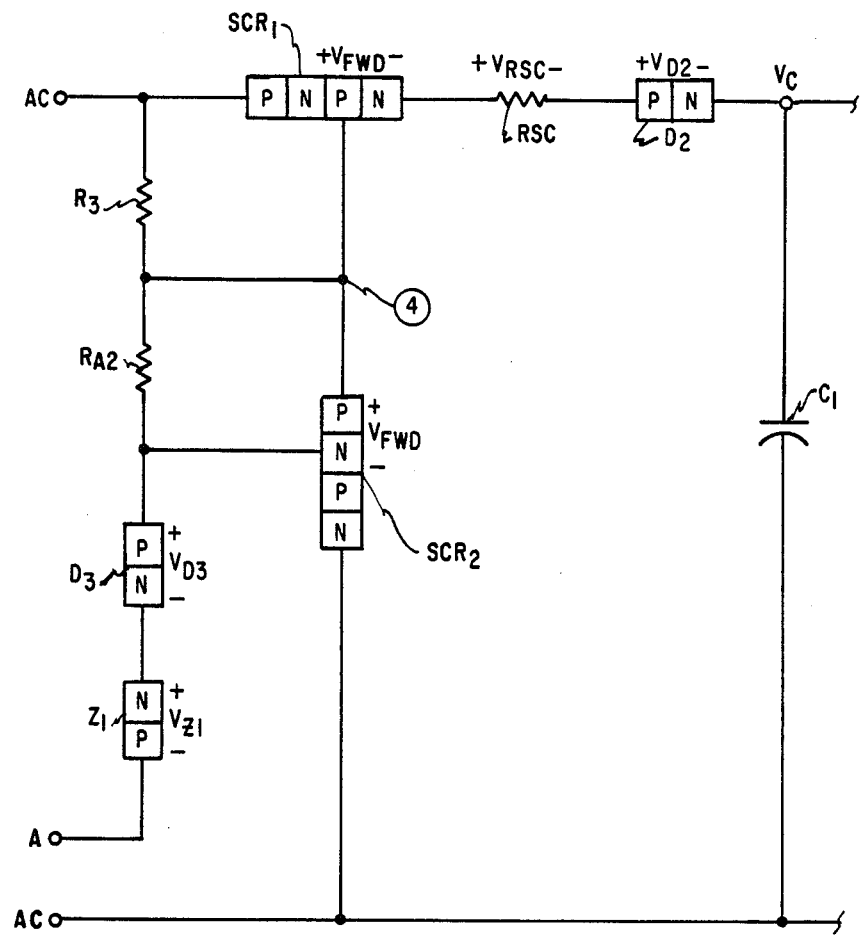
FIG. 4 is a partial schematic diagram, with device junctions illustrated, of an embodiment of a portion of the circuit of the invention.

While turn off of $SCR_2$ is triggered by the commencement of conduction through zener diode $Z_1$ when $V_c$ reaches approximately $V_A+V_{z1}$, a more precise analysis of the turn on function is described with respect to the implementation shown in FIG. 4 which reveals that zener diode $Z_1$ conducts when $V_c+V_{D2}+V_{RSC}+V_{fwd}=V_A+V_{z1}+V_{D3}+V_{fwd}$. FIG. 4 shows $SCR_1$ in a P-N-P-N arrangement with its cathode connected through resistor RSC to diode $D_2$. Diode $D_2$ is connected to capacitor $C_1$. The cathode gate of $SCR_1$ is connected to node 4. The anode of $SCR_2$ is connected to node 4 while the cathode of $SCR_2$ is connected to AC ground. Diode $D_3$ has its anode connected to the anode gate of $SCR_2$ and, through anode gate bias resistor $R_{2A}$, to node 4. The cathode of diode $D_3$ is connected to the cathode of zener diode $Z_1$ while the anode of zener diode $Z_1$ is connected to node A.

When the voltage $V_c$ on the capacitor $C_1$ reaches the fully charged condition, $SCR_1$ is to be turned off. This will occur when $SCR_2$ is turned on and current is pulled from the cathode gate of $SCR_1$ through node 4 and into the anode of $SCR_2$. Turn on of $SCR_2$ occurs when $V_c$ plus the diode drop of diode $D_2$ plus the voltage drop $V_{RSC}$ across resistor RSC and the forward biased diode drop $V_{fwd}$ of the cathode gate to cathode junction of $SCR_1$ ($V_c+V_{D2}+V_{RSC}+F_{fwd}$) equals the reference voltage $V_A$ applied to node A plus the avalanche voltage $V_{z1}$ of zener diode $Z_1$ plus the diode drop of diode $D_2$ and the forward biased diode drop $V_{fwd}$ of the anode gate to anode junction of $SCR_2$ ($V_A+V_{z1}+V_{D3}+V_{fwd}$). Assuming that diodes $D_2$ and $D_3$ are similar and that $V_{RSC}$ is small and that the junction voltage drops $V_{fwd}$ for $SCR_1$ and $SCR_2$ are similar, this equation can be approximated as $V_c=V_A+V_{z1}$.

Absent another current source for the anode $A_2$ of $SCR_2$, the device $SCR_2$ would turn off as soon as $SCR_1$ turns off thereby allowing $SCR_1$ to turn on again. Thus, the presence of a current path through $R_3$ is significant in that current will flow from the AC line through $R_3$ and into the anode $A_2$ of $SCR_2$. So long as the line voltage is sufficiently high to provide holding current to the anode $A_2$ of $SCR_2$, $SCR_2$ will remain ON. When $SCR_2$ is ON, anode gate $AG_2$ will be held at a voltage near the voltage of cathode $C_2$. It is noted that cathode $C_2$ is at AC ground. In this situation, diode $D_3$ is reverse biased and no current flows from node A to the anode gate $AG_2$ of $SCR_2$. By choosing the value of $R_{2A}$ it is possible to select the line voltage below which $SCR_2$ will turn off. Since the current flowing from $R_3$ will flow to one of $R_{2A}$ or $A_2$, smaller resistances for $R_2$ will result in increased current flow through $R_{2A}$ and into $AG_R$ rather than into $A_2$ and will result in $SCR_2$ turning off at a higher current through $R_3$ and correspondingly higher line voltage than would occur if the resistance of $R_{2A}$ were greater.

If the capacitor voltage is below the selected upper limit, it is desirable to obtain additional charging as the AC line voltage drops through an appropriate voltage level. The appropriate voltage level is that low enough to avoid excessive current yet high enough to provide a charging current to the capacitor $C_1$.

When $SCR_2$ is conducting it has a low voltage drop (approximately 1 volt) from anode to cathode thus causing the cathode gate of $SCR_1$ to be at a lower potential than the cathode of $SCR_1$. The only way for $SCR_1$ to turn on is to turn off $SCR_2$ and thus allow the potential at node 4 and the cathode gate of $SCR_1$ to rise above the potential at the cathode of $SCR_1$. $SCR_2$ will turn off when the AC line voltage drops sufficiently that the current through $R_3$ is less than the holding current of $SCR_2$. This allows the voltage at node 4 to rise. If the AC line voltage exceeds the capacitor voltage, the voltage at the cathode gate of $SCR_1$ will exceed the cathode voltage and $SCR_1$ will turn on thereby providing charging current to the charge storage means $C_1$.

Another feature of the invention is the peak by peak current limit function which is activated by excess current flowing through $SCR_1$. The control circuitry includes a current detector which is made up of resistor RSC and transistor QSC. The base of PNP transistor QSC is connected to the first end of resistor RSC and the emitter of transistor QSC is connected to the other end of resistor RSC. The first end of resistor RSC is connected, through diode $D_2$, to the high voltage side of capacitor $C_1$ while the other end of resistor RSC is connected to the cathode of $SCR_1$. The collector of transistor QSC is connected to the cathode gate $CG_2$ of $SCR_2$ and to a first end of resistor $R_{2c}$ which has its other end connected to the AC low line. Thus, when a sufficiently large current flows through resistor RSC, transistor QSC will turn on, thus providing a current path from the AC line to ground through resistor $R_{2c}$. If this establishes a voltage drop of at least one diode drop across $R_{2c}$ it will cause $SCR_2$ to turn on, thereby shunting current from cathode gate $CG_1$ of $SCR_1$ and causing $SCR_1$ to turn off. When $SCR_1$ turns off, current will flow via $R_3$ and through $SCR_2$ to AC ground. This will hold $SCR_2$ on and hence $SCR_1$ off, until the line voltage falls to the point where it can no longer deliver holding current through $R_3$ to $SCR_2$. This is referred to as a lockout function and serves as overcurrent protection for the circuitry.

Figure 3A:
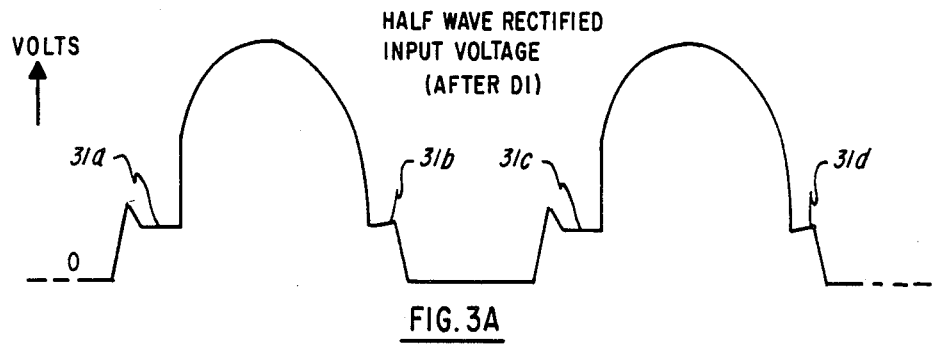
FIG. 3 illustrates the voltage and current waveforms existing in a steady state operating mode.
Figure 3B:
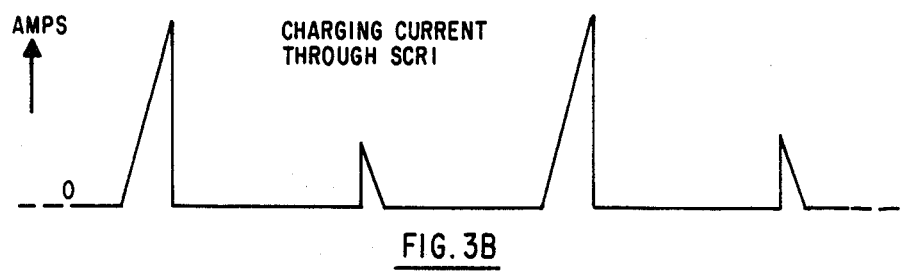
Figure 3C:
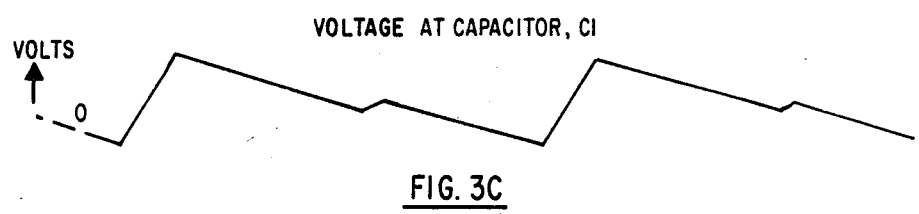
Figure 3:
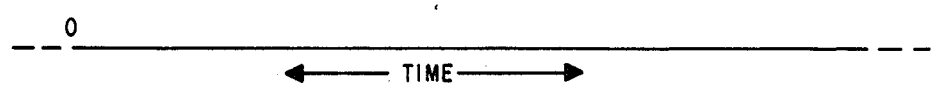

There are many alternative implementations of the over current limiting feature of the invention which use for instance the cathode gate, anode gate or both of $SCR_1$ to initiate conduction in $SCR_2$. Additionally, QSC and RSC would be alternatively connected or RSC could be eliminated by connecting QSC across the gate to cathode junction of $SCR_1$ since this junction's voltage is proportional to current. In operation, the AC line voltage shown in FIG. 3A is half wave rectified and includes steps $31a$–$d$ during the capacitor charging intervals. The charging current through $SCR_1$ is shown in FIG. 3B and the voltage $V_c$ on capacitor $C_1$ is shown in FIG. 3C. These waveforms are representative of a steady state operating mode.

From the preceding description of the preferred embodiment it is evident that the objects of the invention are attained, and although the invention has been described and illustrated in detail, it is to be clearly understood that the same is by way of illustration and example only and is not meant to be taken by way of limitation. It is intended that the following claims shall be interpreted in accordance with the full scope of the underlying invention including any and all variations thereof which might be suggested or obvious to those skilled in the semiconductor arts.

What is claimed is:

1. An improved switching circuit for a direct coupled power converter comprising:
    a gate turn off SCR having and anode and an anode gate connected to a first AC input and having a cathode connected to a charge storage means and having a cathode gate connected via a bleeder resistor to said first AC input,
    a second SCR having an anode connected to said cathode gate of said gate turn off SCR, and having an anode gate connected via an anode gate bias resistor to said cathode gate of said gate turn off SCR, and having a cathode connected to a second AC input and having a a cathode gate,
    first means for providing a charging current level indicating signal in response to the current flowing from said cathode of said gate turn off SCR, said charging current level indicating signal being provided to said cathode gate of said second SCR, second means for providing a fully charged indicating signal in response to the voltage level on said cathode of said gate turn off SCR.

2. An improved switching circuit as claimed in claim 1 wherein said first means comprises a first resistor having a first terminal connected to said cathode of said gate turn off SCR and a PNP transistor having an emitter connected to said cathode of said gate turn off SCR and having a base connected to a second terminal of said first resistor and having a collector connected to said cathode gate of said second SCR, said collector being further connected to said second AC input via a cathode gate bias resistor.

3. An improved switching circuit as claimed in claim 1 wherein said second means comprises a diode having an anode connected to said anode gate of said second SCR and having a cathode,
- a zener diode having a cathode connected to said cathode of said diode and having an anode, and
- a reference voltage terminal connected to said anode of said zener diode.

4. An improved switching circuit as claimed in claim 2 wherein said second means comprises a diode having an anode connected to said anode gate of said second SCR and having a cathode.
- a zener diode having a cathode connected to said cathode of said diode and having an anode, and
- a reference voltage terminal connected to said anode of said zener diode.

5. An improved switching circuit as claimed in claim 4 further comprising a second diode having an anode connected to said base of said PNP transistor and a cathode connected to a first output terminal.

6. An integrated switching power supply adapted for connection to an AC line without intervening voltage reducing means and adapted for connection to a charge storage means, comprising:
- first means for providing a current path from said AC line to said charge storage means when said AC line has a voltage exceeding the voltage on said charge storage means, said first means comprising a gate turn off SCR;
- second means for interrupting said current path when the voltage of said charge storage means exceeds a predetermined maximum voltage, said second means comprising a second SCR having its anode connected to the cathode gate of said gate turn off SCR;
- third means for interrupting said current path when the current through said current path exceeds a predetermined maximum current, and a zener diode having its cathode connected to the cathode of a second diode and its anode connected to a node, said second diode having its anode connected to the anode gate of said second SCR.

7. An integrated switching power supply as claimed in claim 6 further comprising a bleeder resistor and an anode bias resistor connected in series between said AC line and said anode of said second diode, said anode bias resistor being connected between said anode of said second diode and said anode gate of said second SCR.

8. An integrated switching power supply as claimed in claim 7 wherein said third means comprises a current sensing circuit for sensing the current through said gate turn off SCR and for providing an output signal when said current exceeds a predetermined maximum current.

9. An integrated switching power supply as claimed in claim 8 wherein said output signal is provided to ground via a cathode gate bias resistor and is further provided to a cathode gate of said second SCR.

10. An integrated switching power supply as claimed in claim 9 wherein said current sensing circuit comprises a sense resistor and a sense transistor, said sense resistor connected in series with said gate turn off SCR, and said sense transistor having a base connected to said sense resistor and an emitter connected to the other terminal of said resistor and to said cathode of said gate turn off SCR and a collector for providing said output signal.

11. An integrated switching power supply as claimed in claim 9 wherein said current sensing circuit comprises a means for biasing said cathode gate bias resistor in response to the current flowing from said cathode of said gate turn off SCR such that when the current flowing from said cathode of said gate turn off SCR exceeds said predetermined maximum current said second SCR will be turned on and current will be pulled from said cathode gate of said gate turn off SCR to thereby turn off said gate turn off SCR.

12. An integrated switching power supply as claimed in claim 11 wherein said means for biasing said cathode gate bias resistor comprises a transistor having its emitter and base connected across the cathode gate to cathode junction of said gate turn off SCR and having its collector connected to said cathode gate of said second SCR.

13. An improved integrated voltage pre-regulator adapted for direct connection to an AC line without external voltage reducing means comprising:
(a) a switching means for ON-OFF switching of the flow of charging current through said pre-regulator when said AC line has a voltage exceeding a first voltage, said switching means comprising a gate turn off SCR having a resistor connected between an anode of said gate turn off SCR and a cathode gate of said gate turn off SCR such that application of a positive voltage across the anode to cathode of said gate turn off SCR will result in a current flow through said resistor and into said cathode gate of said gate turn off SCR to turn on said gate turn off SCR;
(b) a control means for turning said switching means off to discontinue the flow of charging current through said switching means when said first voltage exceeds a predetermined maximum voltage, said control means also turning said switching means off to disconinue the flow of charging current through said switching means when said charging current exceeds a predetermined maximum current, said control means comprising:
(i) a second SCR having an anode connected to said cathode gate of said gate turn off SCR, having an anode gate connected via an anode gate bias resistor to said cathode gate of said gate turn off SCR, having a cathode connected to said AC low line and having a cathode gate connected via a cathode gate bias resistor to said AC low line;
(ii) a reference terminal for external connection to a source of reference voltage, said reference terminal connected to an anode of a zener diode having its cathode connected to a cathode of a diode, said diode having an anode connected to said anode gate of said second SCR, and (iii) a current sensing circuit for providing a bias voltage to said cathode gate bias resistor in response to a charging current flowing from said cathode of said gate turn off SCR such that said bias voltage exceeds one diode drop when said charging current exceeds a predetermined maximum current.

14. An improved integrated voltage preregulator as claimed in claim 13 wherein said gate turn off SCR will remain ON following turn on so long as a current at least as great as said SCR's holding current flows from anode to cathode of said gate turn off SCR.

15. An improved integrated voltage preregulator as claimed in claim 14 wherein said current can be reduced below said holding current of said gate turn off SCR by pulling current from said cathode gate of said gate turn off SCR.

16. An improved integrated voltage preregulator as claimed in claim 15 wherein current can be pulled from said cathode gate of said gate turn off SCR by turn-on of said second SCR.

17. An improved integrated voltage preregulator as claimed in claim 16 wherein said second SCR is turned on when a voltage on said anode of said second SCR exceeds said reference voltage, plus the zener breakdown voltage plus the diode drop of said diode and a voltage of at least one diode drop is established across at least ne of said cathode gate bias resistor or said anode gate bias resistor.

* * * * *